(12) United States Patent
Hviid et al.

(10) Patent No.: US 12,317,343 B2
(45) Date of Patent: May 27, 2025

(54) ACTIVATING A SIDELINK DEVICE FOR PROVIDING A DATA CONNECTION

(71) Applicant: NOKIA TECHNOLOGIES OY, Espoo (FI)

(72) Inventors: Jan Hviid, Klarup (DK); Erika Portela Lopes De Almeida, Aalborg (DK); Stig Blücher Brink, Aalborg Øst (DK); Karsten A. Petersen, Aalborg (DK); Nuno Kiilerich Pratas, Gistrup (DK); Lars Holst Christensen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 356 days.

(21) Appl. No.: 17/801,207

(22) PCT Filed: Feb. 4, 2021

(86) PCT No.: PCT/FI2021/050078
§ 371 (c)(1),
(2) Date: Aug. 19, 2022

(87) PCT Pub. No.: WO2021/165568
PCT Pub. Date: Aug. 26, 2021

(65) Prior Publication Data
US 2023/0101924 A1    Mar. 30, 2023

(30) Foreign Application Priority Data
Feb. 21, 2020   (FI) ...................................... 20205177

(51) Int. Cl.
*H04W 76/14*   (2018.01)
*H04W 36/00*   (2009.01)
(Continued)

(52) U.S. Cl.
CPC .......... *H04W 76/14* (2018.02); *H04W 36/037* (2023.05); *H04W 36/302* (2023.05); *H04W 92/18* (2013.01)

(58) Field of Classification Search
CPC . H04W 76/14; H04W 36/302; H04W 36/037; H04W 92/18
See application file for complete search history.

(56) References Cited

U.S. PATENT DOCUMENTS

| 2008/0293404 A1* | 11/2008 | Scherzer | ............... | H04W 84/18 |
| | | | | 455/426.1 |
| 2011/0099048 A1* | 4/2011 | Weiss | .................... | H04W 4/029 |
| | | | | 705/7.34 |

(Continued)

FOREIGN PATENT DOCUMENTS

| WO | WO 2016/045745 A1 | 3/2016 | | |
| WO | WO-2018125686 A2 * | 7/2018 | ........... | G01S 17/931 |

OTHER PUBLICATIONS

"3rd Generation Partnership Project; Technical Specification Group Radio Access Network; NR; User Equipment (UE) radio transmission and reception; Part 2: Range 2 Standalone (Release 16)", 3GPP TS 38.101-2 v16.2.0, (Dec. 2019), 157 pages.

(Continued)

*Primary Examiner* — Mewale A Ambaye
(74) *Attorney, Agent, or Firm* — ALSTON & BIRD LLP

(57) ABSTRACT

An apparatus, method, computer program product and system for: receiving information relating to available connections in a wireless network, the wireless network including at least one access node and at least one sidelink device, collecting information relating to a mobility pattern of at least one moveable device within a predetermined area covered by the wireless network, establishing a first data connection to the wireless network for the moveable device, predicting, based on the mobility pattern of the moveable (Continued)

device and the information relating to the wireless network, a second data connection to be established to the wireless network for the moveable device, and sending, in response to determining that at least one criterion related to the first data connection is fulfilled, a request to the at least one access node to activate the at least one sidelink device for providing the second data connection.

20 Claims, 4 Drawing Sheets

(51) Int. Cl.
*H04W 36/30* (2009.01)
*H04W 92/18* (2009.01)

(56) References Cited

U.S. PATENT DOCUMENTS

| | | | |
|---|---|---|---|
| 2013/0007223 A1* | 1/2013 | Luby | H04N 21/234327 709/219 |
| 2014/0304425 A1* | 10/2014 | Taneja | H04L 47/12 709/235 |
| 2015/0029866 A1 | 1/2015 | Liao et al. | |
| 2015/0131540 A1 | 5/2015 | Koo et al. | |
| 2015/0236966 A1* | 8/2015 | Francini | H04L 43/16 370/235 |
| 2017/0086114 A1 | 3/2017 | Jung et al. | |
| 2017/0251347 A1* | 8/2017 | Mehta | H04W 4/08 |
| 2018/0035448 A1 | 2/2018 | Gupta et al. | |
| 2018/0049259 A1 | 2/2018 | Aminaka et al. | |
| 2018/0077746 A1* | 3/2018 | Lee | H04L 5/006 |
| 2018/0234913 A1 | 8/2018 | Kahtava et al. | |

OTHER PUBLICATIONS

International Search Report and Written Opinion for Patent Cooperation Treaty Application No. PCT/FI2021/050078 dated Apr. 22, 2021, 14 pages.

Notice of Allowance for Finland Application No. 20205177 dated Oct. 8, 2020, 8 pages.

Waqas et al., "A Comprehensive Survey on Mobility-Aware D2D Communications: Principles, Practice and Challenges", IEEE Communications Surveys & Tutorials, vol. 22, No. 3, (Jun. 19, 2019), 24 pages.

* cited by examiner

ACTIVATING A SIDELINK DEVICE FOR PROVIDING A DATA CONNECTION

CROSS-REFERENCE TO RELATED APPLICATIONS

This application is a national phase entry of International Application No. PCT/FI2021/050078, filed Feb. 4, 2021, which claims priority to Finnish Application No. 20205177, filed Feb. 21, 2020, the contents of which are hereby incorporated by reference in their entirety.

TECHNICAL FIELD

The present application relates generally to activating a sidelink device. More specifically, the present application relates to activating a sidelink device for providing a data connection.

BACKGROUND

The number of wireless networks utilized in different environments is increasing. For example, utilizing wireless networks in a manufacturing environment may enable improved production output in terms of automation of robots, for example.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising: means for receiving information relating to available connections in a wireless network, the wireless network comprising at least one access node and at least one sidelink device, means for collecting information relating to a mobility pattern of at least one moveable device within a predetermined area covered by the wireless network, means for establishing a first data connection to the wireless network for the moveable device, means for predicting, based on the mobility pattern of the moveable device and the information relating to the wireless network, a second data connection to be established to the wireless network for the moveable device, and means for sending, in response to determining that at least one criterion related to the first data connection is fulfilled, a request to the at least one access node to activate the at least one sidelink device for providing the second data connection.

According to a second aspect of the invention, there is provided a method comprising: receiving information relating to available connections in a wireless network, the wireless network comprising at least one access node and at least one sidelink device, collecting information relating to a mobility pattern of at least one moveable device within a predetermined area covered by the wireless network, establishing a first data connection to the wireless network for the moveable device, predicting, based on the mobility pattern of the moveable device and the information relating to the wireless network, a second data connection to be established to the wireless network for the moveable device, and sending, in response to determining that at least one criterion related to the first data connection is fulfilled, a request to the at least one access node to activate the at least one sidelink device for providing the second data connection.

According to a third aspect of the invention, there is provided a computer program comprising instructions for causing an apparatus to perform at least the following: receiving information relating to available connections in a wireless network, the wireless network comprising at least one access node and at least one sidelink device, collecting information relating to a mobility pattern of at least one moveable device within a predetermined area covered by the wireless network, establishing a first data connection to the wireless network for the moveable device, predicting, based on the mobility pattern of the moveable device and the information relating to the wireless network, a second data connection to be established to the wireless network for the moveable device, and sending, in response to determining that at least one criterion related to the first data connection is fulfilled, a request to the at least one access node to activate the at least one sidelink device for providing the second data connection.

According to a fourth aspect of the invention, there is provided an apparatus comprising at least one processor and at least one memory including computer program code, the at least one memory and the computer program code configured to with the at least one processor, cause the apparatus at least to: receive information relating to available connections in a wireless network, the wireless network comprising at least one access node and at least one sidelink device, collect information relating to a mobility pattern of at least one moveable device within a predetermined area covered by the wireless network, establish a first data connection to the wireless network for the moveable device, predict, based on the mobility pattern of the moveable device and the information relating to the available connections in the wireless network, a second data connection to be established to the wireless network for the moveable device, and send, in response to determining that at least one criterion related to the first data connection is fulfilled, a request to the at least one access node to activate the at least one sidelink device for providing the second data connection.

According to a fifth aspect of the invention, there is provided a non-transitory computer readable medium comprising program instructions for causing an apparatus to perform at least the following: receiving information relating to available connections in a wireless network, the wireless network comprising at least one access node and at least one sidelink device, collecting information relating to a mobility pattern of at least one moveable device within a predetermined area covered by the wireless network, establishing a first data connection to the wireless network for the moveable device, predicting, based on the mobility pattern of the moveable device and the information relating to the wireless network, a second data connection to be established to the wireless network for the moveable device, and sending, in response to determining that at least one criterion related to the first data connection is fulfilled, a request to the at least one access node to activate the at least one sidelink device for providing the second data connection.

According to a sixth aspect of the invention, there is provided a computer readable medium comprising program instructions for causing an apparatus to perform at least the following: receiving information relating to available connections in a wireless network, the wireless network comprising at least one access node and at least one sidelink device, collecting information relating to a mobility pattern of at least one moveable device within a predetermined area covered by the wireless network, establishing a first data connection to the wireless network for the moveable device, predicting, based on the mobility pattern of the moveable device and the information relating to the wireless network, a second data connection to be established to the wireless network for the moveable device, and sending, in response to determining that at least one criterion related to the first data connection is fulfilled, a request to the at least one access node to activate the at least one sidelink device for providing the second data connection.

According to a seventh aspect of the invention, there is provided a system configured to: receive information relating to available connections in a wireless network, the wireless network comprising at least one access node and at least one sidelink device, collect information relating to a mobility pattern of at least one moveable device within a predetermined area covered by the wireless network, establish a first data connection to the wireless network for the moveable device, predict, based on the mobility pattern of the moveable device and the information relating to the wireless network, a second data connection to be established to the wireless network for the moveable device, and send, in response to determining that at least one criterion related to the first data connection is fulfilled, a request to the at least one access node to activate the at least one sidelink device for providing the second data connection.

According to an eight aspect of the invention, there is provided a system comprising: means for receiving information relating to available connections in a wireless network, the wireless network comprising at least one access node and at least one sidelink device, means for collecting information relating to a mobility pattern of at least one moveable device within a predetermined area covered by the wireless network, means for establishing a first data connection to the wireless network for the moveable device, means for predicting, based on the mobility pattern of the moveable device and the information relating to the wireless network, a second data connection to be established to the wireless network for the moveable device, and means for sending, in response to determining that at least one criterion related to the first data connection is fulfilled, a request to the at least one access node to activate the at least one sidelink device for providing the second data connection.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to a predictive network connection and a self-learning algorithm, for example, in a production environment.

Some example embodiments relate to an apparatus and/or a system configured to receive information relating to available network connections on a wireless network, the wireless network comprising at least one access node and at least one sidelink device, collect information relating to a mobility pattern of at least one moveable device within a predetermined area covered by the wireless network, establish a first data connection to the wireless network for the moveable device, predict, based on the mobility pattern of the moveable device and the information relating to the available connections in the wireless network, a second data connection to be established to the wireless network for the moveable device, and send, in response to determining that at least one criterion related to the first data connection is fulfilled, a request to the at least one access node to activate the at least one sidelink device for providing the second data connection.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
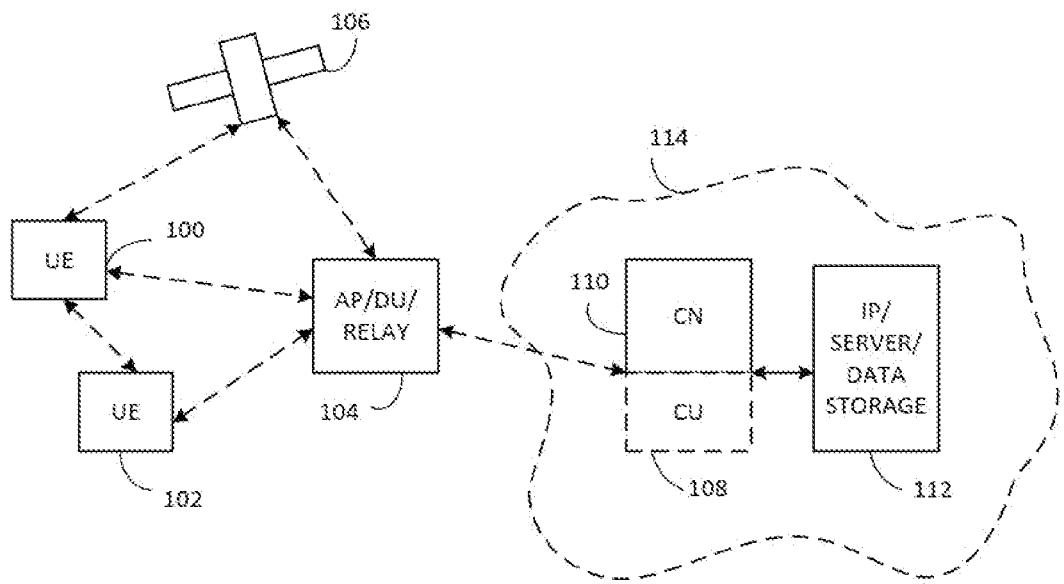
FIG. 1 shows a part of an exemplifying radio access network in which examples of disclosed embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system may comprise more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device refers, for example, to a wireless mobile communication device operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, navigation device, vehicle infotainment system, and multimedia device, or any combination thereof. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of content delivery use cases and related applications including, for example, video streaming, audio streaming, augmented reality, gaming, map data, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

As commonly known in connection with wireless communication systems, control or management information is transferred over a radio interface, e.g. between the terminal device 100 and the access node 104.

At least a part of the radio access network presented in the example of FIG. 1 may be utilized, among other things, in different production environments such as factories for providing an ultra reliable low-latency communication (URLLC) wireless network. Requirements for URLLC set by the 3rd Generation Partnership Project (3GPP) are defined as an air interface latency of 1 ms and 99.99% system reliability for URLLC.

A production environment may set very high standards for communication. For example, ultra-reliable data connections may be required for sensors, welding machines, robots or the like, in order to avoid disruption and/or accidents in the process. Therefore, an URLLC network such as a Frequency Range 2 mmWave band (24-100 GHz) of 3GPPP specification may be utilised in a production environment. An URLLC network may accommodate high data rates and high reliability when a device connected to the URLLC network is within a line of sight (LOS). However, a production environment may comprise moving devices and/or different kinds of obstacles such as solid walls absorbing mmWaves and causing a device to temporarily be in a no-line of sight (NLOS) position which may make it challenging to provide reliable data connections.

Figure 2:
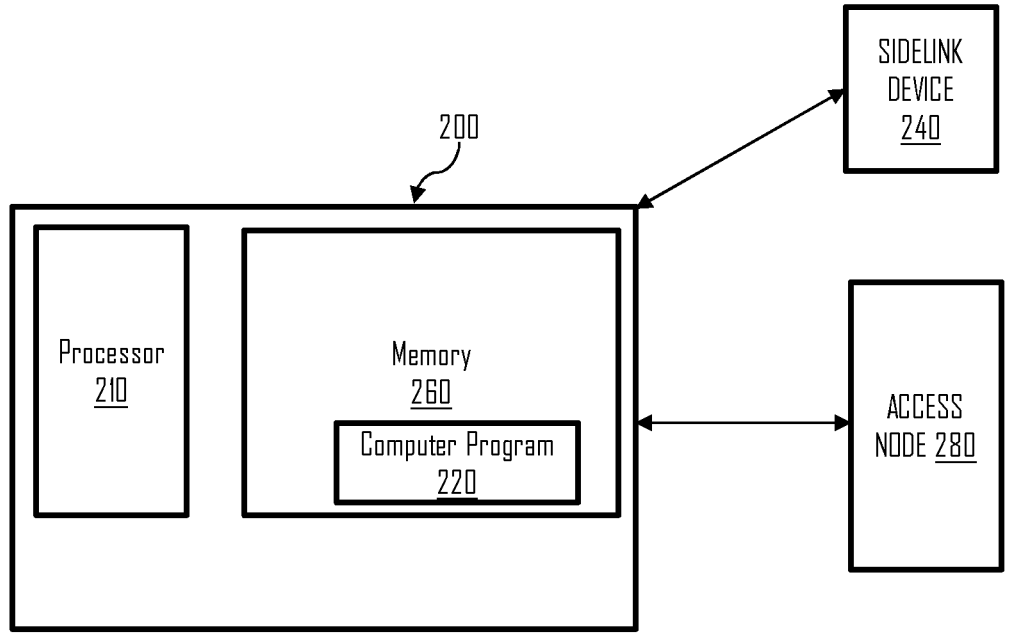
FIG. 2 shows a block diagram of an example device in which examples of the disclosed embodiments may be applied.

FIG. 2 is a block diagram depicting an apparatus 200 operating in accordance with an example embodiment of the invention. The apparatus 200 may be, for example, a chip, a chipset, an electronic device such as a mobile computing device, an industrial robot or the like. In the example of FIG. 2 it is assumed that the apparatus 200 comprises a moveable device configured to move within a production environment.

According to an example embodiment, the apparatus 200 is configured to communicate with at least one access node 280 such as a radio access network (RAN). An access node 280 may comprise a base station such as a gNodeB or eNodeB. The at least one access node may comprise, for example, one or more RANs provided in a production environment for providing wireless data communication within the production environment.

Without limiting the scope of the claims, an advantage of a wireless network is that cabling in, for example, a production environment may be at least partially avoided. Another advantage is that devices, such as Internet of Things (IoT) devices, may be added and removed without significant installation work.

According to an example embodiment, the apparatus 200 is further configured to communicate with at least one sidelink device 240. According to an example embodiment, a sidelink device 240 comprises a device that enables wireless device-to-device (D2D) communication. D2D communication allows devices in close proximity to communicate using a direct link between each other rather than via an access node such as a gNodeB or eNodeB. For example, the apparatus 200 may be configured to communicate directly with a mobile terminal device, an industrial robot or a welding machine using short-range wireless technology. Various short-range wireless technologies such as Bluetooth, WiFi Direct or LTE Direct may be used to enable D2D communication.

Without limiting the scope of the claims, an advantage of D2D communication is that due to a shorter signal traversal path, low latency communication may be provided.

In the example of FIG. 2, the apparatus 200 comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 is configured to receive information relating to available connections in a wireless network, the wireless network comprising at least one access node 280 and at least one sidelink device 240. According to an example embodiment, the at least one access node 280 comprises at least one radio access network (RAN). According to an example embodiment, the at least one RAN comprises at least one RAN providing the wireless network. The sidelink device 240 may comprise a moveable or stationary device configured to establish a connection with another device. According to an example embodiment, the at least one sidelink device 240 comprises a device configured to establish a device-to-device (D2D) connection with another device. For example, the sidelink device 240 may be configured to establish a wireless connection with the a least one access node 280 and/or the apparatus 200. According to an example embodiment, the at least one sidelink device is connected to the at least one access node 280.

An available connection in a wireless network may comprise a connection available for the apparatus 200. The apparatus 200 may be configured to receive information relating to available connections in a wireless network from another device or the apparatus 200 may be configured to store the information relating to the available wireless network in the at least one memory 260. For example, the apparatus 200 may be configured to store a database comprising information relating to the available connections in the wireless network.

According to an example embodiment, the apparatus 200 comprises a learning algorithm. The learning algorithm may be stored on the at least one memory 260. According to an example embodiment, the apparatus 200 is configured to activate the learning algorithm in response to determining that at least one activation criterion is fulfilled. The at least one criterion may relate to, for example, a change in a parameter value relating to a data connection. According to an example embodiment, the apparatus 200 is configured to activate a learning algorithm in response to a loss of connection to the wireless network. Activating a learning algorithm may comprise, for example, executing or running the learning algorithm.

Without limiting the scope of the claims, an advantage of activating a learning algorithm in response to a loss of connection may be that the power consumption may be reduced compared to a situation where the algorithm is running constantly. Another advantage may be that the learning algorithm may be included in different devices with limited effect on the power budget of the devices.

The learning algorithm may be configured to perform different functions such as discovering devices, identifying available wireless networks, storing information on available wireless networks, or the like. According to an example embodiment, the apparatus 200 is configured to trigger a network scan for discovering sidelink devices. For example, the apparatus 200 may be configured to trigger a network scan in response to a loss of connection to the wireless network. Triggering a network scan may comprise activating one or more sidelink devices.

In addition to information relating to available connection in the wireless network, the apparatus 200 may be configured to receive other information relating to the wireless network that can be utilized by the learning algorithm. For example, the apparatus 200 may be configured to receive information about available access nodes, available devices, or the like. The structure of the wireless network may comprise a physical structure or a logical structure. The physical structure may comprise, for example, locations and/or capabilities of one or more devices. The logical structure may comprise, for example, information on how data flows within the wireless network. As another example, the information relating to the wireless network may comprise information on usage of the wireless network. Information on usage of the wireless network may comprise, for example, information on previous and/or predicted connections or the like.

According to an example embodiment, the information relating to the available connections in the wireless network comprises information on a plurality of previously established data connections between the moveable device and the wireless network. According to an example embodiment information on a previously established connection comprises a sequence of connections. For example, a connection may be associated with information about a preceding connection that was established before the connection and information about a subsequent connection that was established after the connection. In other words, information on a plurality of previously established connections may comprise a sequence of connections.

According to an example embodiment, the apparatus 200 is configured to update the information relating to available connections in the wireless network. The information relating to the available connections in the wireless network may be updated continuously, at predetermined intervals or in response to detecting a change in the available connections in the wireless network.

According to an example embodiment, the apparatus 200 is configured to collect information relating to a mobility pattern of at least one moveable device within a predetermined area covered by the wireless network. According to an example embodiment, collecting information relation to a mobility pattern comprises collecting data relating to movements of the at least one moveable device within the predetermined area.

A mobility pattern may comprise information on how the moveable device moves or is expected to move within the predetermined area. For example, a mobility pattern may comprise a route of the moveable device, a schedule of the moveable device, a trajectory of the moveable device, or the like.

According to an example embodiment, the predetermined area comprises a production environment. A production environment may comprise, for example, a factory or some other industrial environment.

According to an example embodiment, the apparatus 200 is comprised by the moveable device. For example, the apparatus 200 may be comprised by a crane or a robot. According to another example embodiment, the apparatus 200 is operatively connected with the moveable device.

According to an example embodiment, the apparatus 200 is configured to establish a first data connection to the wireless network for the moveable device.

A data connection may comprise connection for transmitting, receiving and/or processing data in an in industrial environment such as a production environment. The data may comprise, for example, measurement data, process control data, or the like. According to an example embodiment, the data comprises real-time data.

According to an example embodiment, the first data connection comprises a data connection between the at least one access node 280 and the moveable device. The at least one access node 280 may comprise, for example, a radio access network (RAN) providing the wireless network. According to another example embodiment, the first data connection comprises a data connection between the at least one sidelink device 240 and the moveable device.

According to an example embodiment, the apparatus 200 is configured to predict, based on the mobility pattern of the moveable device and the information relating to the available connections in the wireless network, a second data connection to be established to the wireless network for the moveable device. For example, the apparatus 200 may be configured to predict, based on the mobility patterns of the moveable device and based on previously established connections between the moveable device and the wireless network, that a second connection will established after the first data connection.

According to an example embodiment, the second data connection comprises a device-to-device connection between the moveable device and the at least one sidelink device 240.

According to an example embodiment, the apparatus 200 is configured to send, in response to determining that at least one criterion related to the first data connection is fulfilled, a request to the at least one access node 280 to activate the at least one sidelink device 240 for providing the second data connection. Activating a sidelink device may comprise, for example, powering on the sidelink device.

The at least one criterion may comprise at least one criterion determined based on the information relating to the available connections in the wireless network. For example, the at least one criterion may comprise to a measurement value defining an acceptable signal level for a data connection. According to an example embodiment, the at least one criterion comprises a signal strength threshold value. According to an example embodiment, the signal strength value comprises a measure of power level the apparatus 200 is receiving from the at least one access node 280. A signal strength threshold value may comprise a received signal strength indicator (RSSI) of 3GPP specifications.

According to an example embodiment, the apparatus 200 is configured to receive information on a signal strength value of an active data connection and compare the signal strength value to the signal strength threshold value. For example, the apparatus 200 may determine that the signal strength value is below the signal strength threshold value and send a request to the at least one access node 280 to activate the at least one sidelink device 240 for providing the second data connection.

The at least one criterion may be stored together with the information relating to available connections in the wireless network or the at least one criterion may be stored separately but associated with the information relating to available connections in the wireless network.

Without limiting the scope of the claims, an advantage of activating a sidelink device in response to determining that at least one criterion related to the first data connection is fulfilled may be that handover for the moveable device may be performed before a loss of connection. Another advantage may be that the sidelink device need to be activated constantly, thereby saving energy and reducing possible interference caused by the sidelink device.

In response to establishing the second data connection, the apparatus 200 may be configured to instruct the at least one access node 280 to release any previous data connections to one or more sidelink devices. According to an example embodiment, the apparatus 200 is configured to send an instruction to the at least one access node 280 to deactivate a previous connection to a sidelink device. Deactivating a previous connection to a sidelink device may comprise, for example, powering off the sidelink device.

According to an example embodiment, the apparatus 200 comprises means for performing the features of the claimed invention, wherein the means for performing comprises at least one processor 110, at least one memory 160 including computer program code 120, the at least one memory 160 and the computer program code 120 configured to, with the at least one processor 110, cause the performance of the apparatus 200. The means for performing the features of the claimed invention may comprise means for receiving information relating to available connections in a wireless network, the wireless network comprising at least one access node and at least one sidelink device, means for collecting information relating to a mobility pattern of at least one moveable device within a predetermined area covered by the wireless network, means for establishing a first data connection to the wireless network for the moveable device, means for predicting, based on the mobility pattern of the moveable device and the information relating to the available connections in the wireless network, a second data connection to be established to the wireless network for the moveable device, and means for sending, in response to determining that at least one criterion related to the first data connection is fulfilled, a request to the at least one access node to activate the at least one sidelink device for providing the second data connection.

The apparatus 200 may further comprise means for updating the information on the available connections in the wireless networks, means for activating a learning algorithm in response to a loss of connection to the wireless network and means for sending an instruction to the at least one access node to deactivate a previous connection to a sidelink device.

Figure 3:
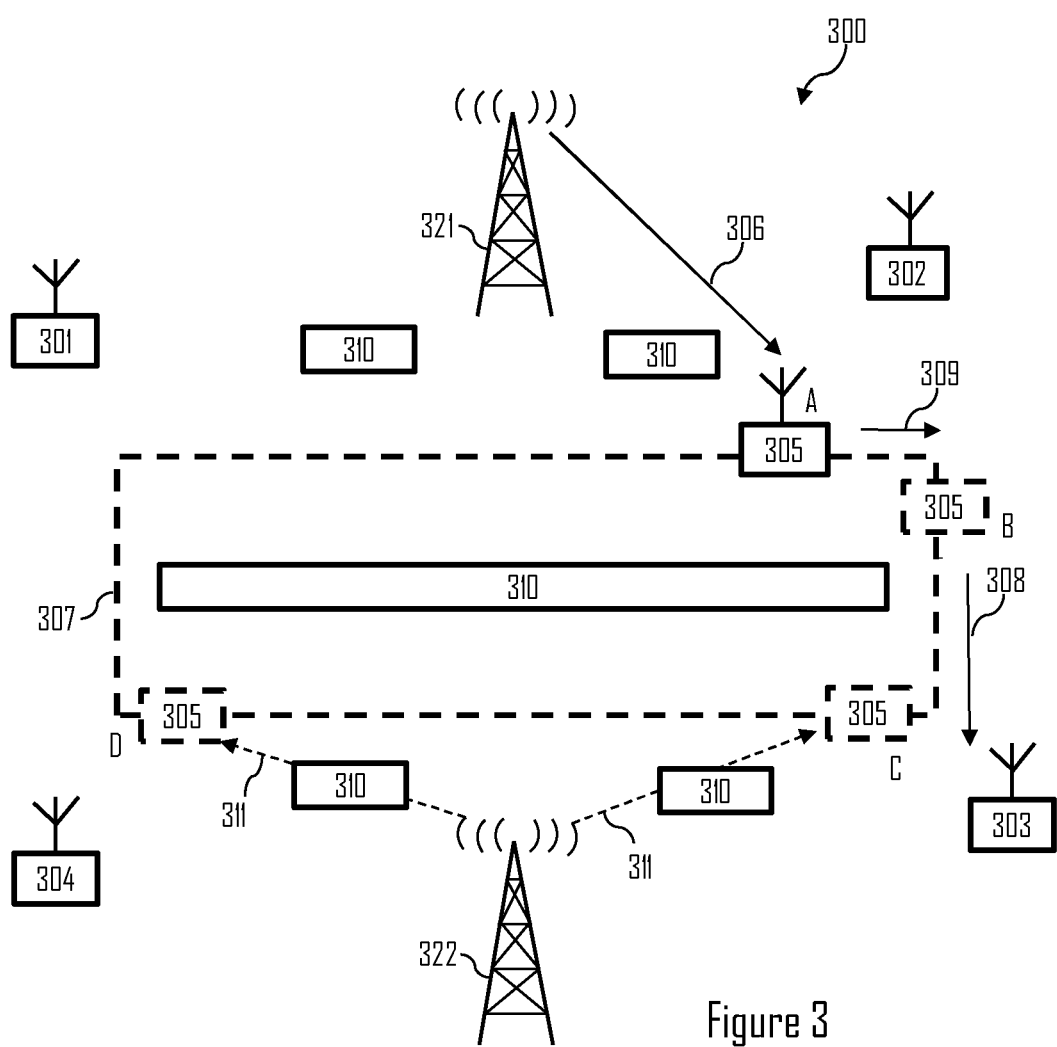
FIG. 3 illustrates an example production environment according to an example embodiment of the invention.

FIG. 3 illustrates an example production environment 300 comprising at least one access node and at least one sidelink device.

In the example of FIG. 3, the production environment comprises a first gNodeBs 321, a second gNodeB 322 for providing a wireless network within the production environment. The production environment further comprises four sidelink devices: sidelink device 301, sidelink device 302, sidelink device 303 and sidelink device 304.

The production environment further comprises a moveable device 305 comprising the apparatus 200. For example, the moveable device 305 may be a robot comprising the apparatus 200. The moveable device 305 is configured to receive information relating to available network connections in the wireless network. In the example of FIG. 3, the moveable device is further configured to store information on the available network connections and collect information on mobility pattern of the moveable device 305. For example, the moveable device 305 may be configured to store information about a track 307 and direction of movement 309 of the moveable device 305. In the example of FIG. 3, the moveable device 305 is configured to move from position A to position B, from position B to position C and from position C to position D.

The production environment 300 further comprises a plurality of obstacles 310 such as solid walls, or the like. The obstacles may cause degradation in a signal strength or loss of connection. In position A, the moveable device 305 is in a line of sight (LOS) position relative to the first gNodeB 321. In other words, the moveable device 305 may be connected to the wireless network via the first gNodeB 321. However, at least positions C and D are such that the moveable device 305 is in a no line of sight (NLOS) position relative to the first gNodeB 321 and the second gNodeB 322. In other words, there will be a loss of connection for the moveable device when moving from position B to C or from position C to D.

In the example of FIG. 3, the moveable device 305 is in positions A and B connected to the wireless network via the first gNodeB 321. Optionally, the moveable device 305 may also be connected to the sidelink device 302 using a device-to-device (D2D) connection. When moving from B to C, at some points the moveable device 305 is in a NLOS position relative to the gNodeB. The moveable device 305 may be aware of the second gNodeB 322, but also be in a NLOS position relative to the second gNodeB 322. Therefore, the moveable device is configured to send a request to the first gNodeB 321 to activate the sidelink device 303 for providing a connection to the wireless network for the moveable device 305. In the example of FIG. 3, the first gNodeB 321 may be configured to activate the sidelink device 303 directly or via the sidelink device 302.

The moveable device 305 is configured to send the request in response to determining that a predetermined criterion relating to an active connection is fulfilled. In the example of FIG. 3, the predetermined criterion comprises a received signal strength threshold value. For example, assuming the moveable device is in position B and moving towards position C, the moveable device 305 may be configured to send the request in response to determining that the signal strength of connection 306 is below the received signal strength threshold value.

The moveable device 305 is configured to, based on the information relating to available connections in the wireless network and information relating to the mobility pattern of the moveable device 305, predict a data connection to be established to the wireless network for the moveable device 305. For example, the moveable device 305 may predict based in information relating to available connections that the connection 308 follows the connection 306. In other words, the moveable device 305 may predict that the connection to the first gNodeB 321 is followed by a D2D connection to the sidelink device 303.

The moveable device 305 is configured to send, in response to determining that at least one criterion related to the connection 306 is fulfilled, a request to the first gNodeB 321 to activate the connection 308. The moveable device 305 is further configured to send an instruction to the first gNodeB 321 to deactivate the previous sidelink connection to the sidelink device 302.

Figure 7:
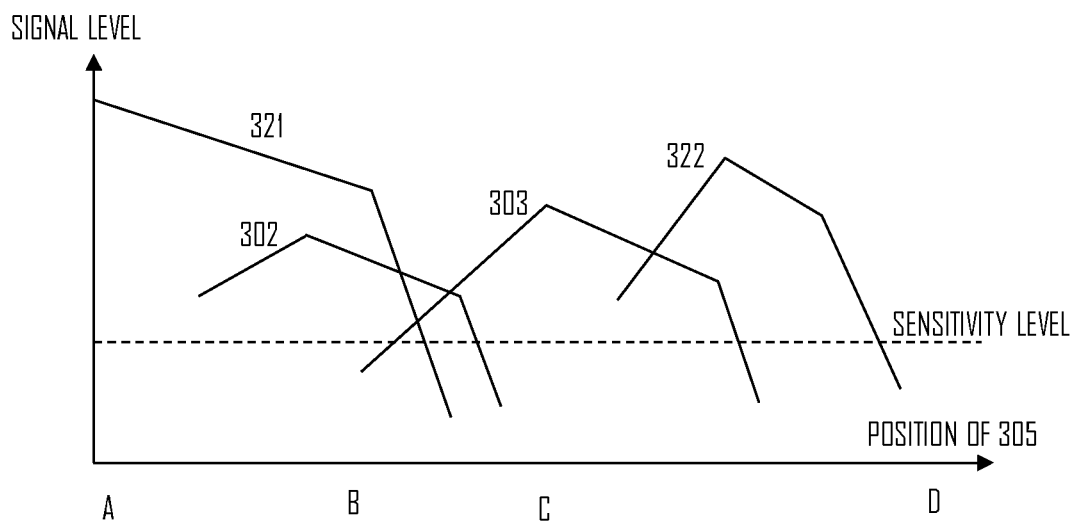
FIG. 7 illustrates an example diagram according to an example embodiment of the invention.

FIG. 7 illustrates an example diagram of signal levels relating to the moveable device 305 in the example of FIG. 3. The signal levels are illustrated with respect to positions A, B, C and D of the moveable device 305 along the track 307. In the example of FIG. 7, the signal levels illustrate signal strength received by the moveable device 305. The sensitivity level, illustrated by a dashed line, illustrates the minimum signal strength at which the moveable device 305 is able to receive bits being transmitted.

In position A, the moveable device 305 has established a data connection to the first gNodeB 321 and moves towards position B. Before reaching position B, the moveable device 305 establishes a data connection to a sidelink device 302 as the received signal level from the first gNodeB 321 is decreasing.

Upon reaching position B, the moveable device 305 establishes a data connection to a sidelink device 303 and instructs the first gNodeB 321 to deactivate the sidelink device 302. The received signal level from the sidelink device 303 increases until the moveable device 305 reaches position C. When moving from position C to position D, the received signal level from the sidelink device 303 starts to decrease and in response to the signal level reaching a signal strength value below a signal strength threshold value, the moveable device establishes a data connection to the second gNodeB 322.

Figure 4:
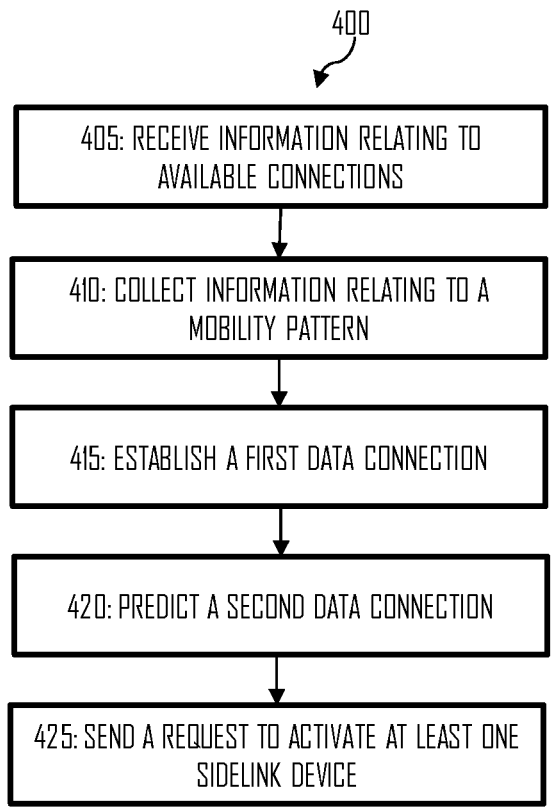
FIG. 4 illustrates an example method according to an example embodiment of the invention.

FIG. 4 illustrates a method 400 incorporating aspects of the previously disclosed embodiments. More specifically, the example method 400 illustrates a method performed by the apparatus 200. The apparatus may be comprised, for example, by the moveable device 305 in the example of FIG. 3.

The method starts with receiving 405 information relating to available connections in a wireless network, the wireless network comprising at least one access node 280 and at least one sidelink device 240. The information relating to the available connections in the wireless network may comprise, for example, information on a plurality of previously established data connections between a moveable device and the wireless network.

The method continues with collecting 410 information relating to a mobility pattern of at least one moveable device within a pre-determined area covered by the wireless network. The pre-determined area may comprise, for example, a production environment.

The method further continues with establishing 415 a first data connection to the wireless network for the moveable device. The first data connection may comprise, for example, a data connection between the at least one access node and the moveable device.

The method further continues with predicting 420, based on the mobility pattern of the moveable device and the information relating to the available connections in the wireless network, a second data connection to be established to the wireless network for the moveable device. The second data connection may comprise, for example, a device-to-device connection between the moveable device and the at least one sidelink device.

The method further continues with sending 425, in response to determining that at least one criterion related to the first data connection is fulfilled, a request to the at least one access node to activate the at least one sidelink device for providing the second data connection. The at least one sidelink device mat be connected to the at least one access node.

Figure 5:
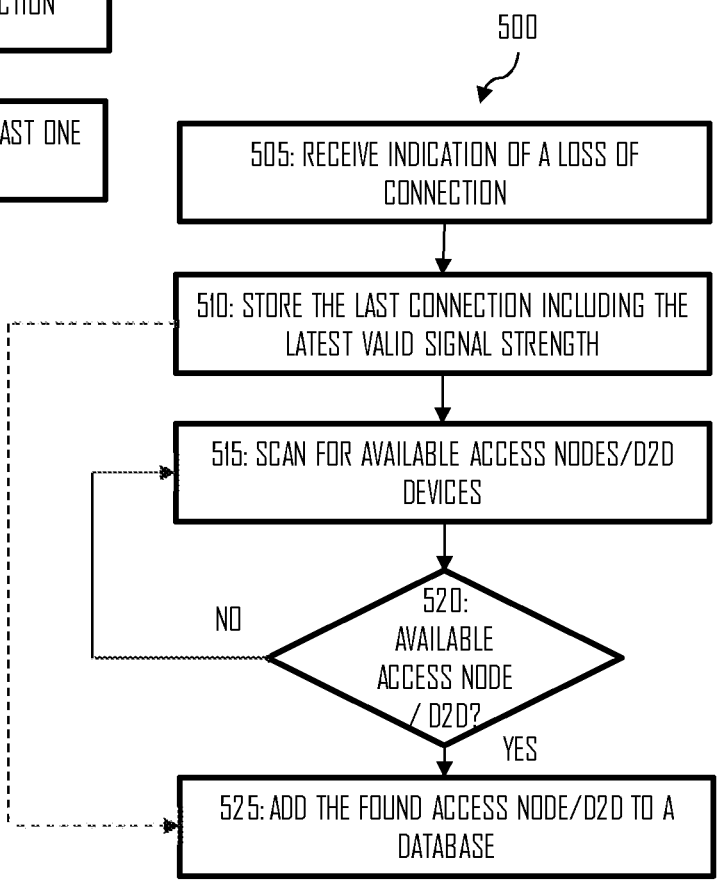
FIG. 5 illustrates another example method according to an example embodiment of the invention.

FIG. 5 illustrates another method 500 incorporating aspects of the previously disclosed embodiments. More specifically, the example method 500 illustrates a method performed by a learning algorithm stored in at least one memory 260 of the apparatus 200. In the example of FIG. 5, the apparatus 200 is configured to store and update a database comprising information relating to available connections in the wireless network.

The method starts with receiving 505 an indication of a loss of connection. This may be caused by, for example, movement of the apparatus 200 to an area where physical obstacles reduce the signal quality.

The method continues with storing 510 in the database stored by the apparatus 200 the last connection including the latest valid signal strength. The latest valid signal strength may comprise the last signal strength value that was above or equal to a signal strength threshold value. The signal strength threshold value may comprise a measurement value defining an acceptable signal level for a data connection.

The method further continues with scanning 515 for available access nodes and/or devices enabling a D2D connection. Scanning for available access nodes and/devices enabling a D2D connection may be triggered by receiving the indication of a loss of connection.

The method further continues with determining 520 whether an available access node or a D2D device is found. If an available access node or a D2D device is found, the method continues with adding 525 the found access node or D2D device to the databased stored by the apparatus 200. However, if an available access node or a D2D device is not found, the scanning continues.

Figure 6:
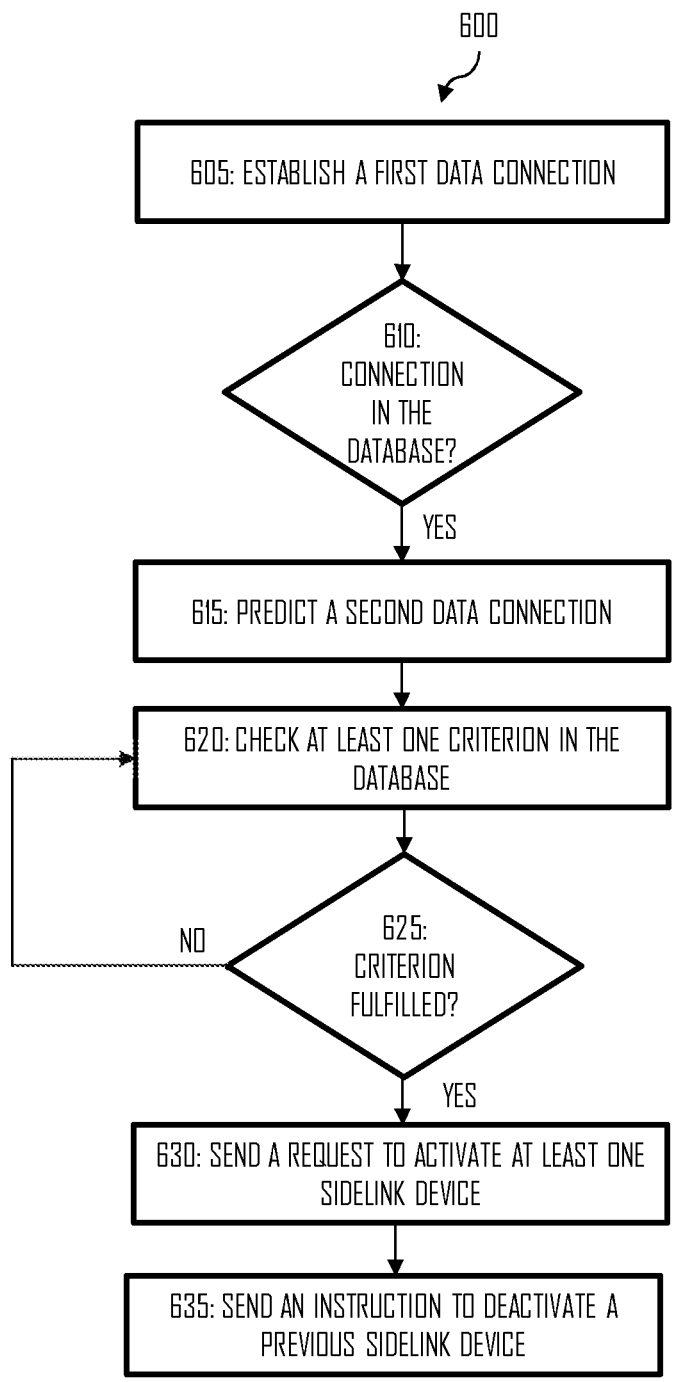
FIG. 6 illustrates a further example method according to an example embodiment of the invention.

FIG. 6 illustrates a further method 600 incorporating aspects of the previously disclosed embodiments. More specifically, the example method 600 illustrates a method performed by the apparatus 200. In the example of FIG. 6, the apparatus 200 is configured to store and update a database comprising information relating to available connections in the wireless network. In the example of FIG. 6, the apparatus 200 is comprised by a moveable device.

The method starts with establishing 605 a first data connection to a wireless network for a moveable device. The first data connection may comprise, for example, a data connection between an access node and the moveable device. Alternatively, the first data connection may comprise, for example, a data connection between a sidelink device and the moveable device.

The method continues with determining 610 whether the connection is stored in the database comprising information relating to available connections in the wireless network. If the connection is stored in the database, the method continues with predicting 615 a second data connection to be established to the wireless network for the moveable device. The second data connection may be predicted based on the information in the database. For example, it may be predicted based on the information in the database that the second data connection typically follows the first data connection. The database may also comprise at least one criterion for changing from the first connection to the second connection.

The method continues with checking 620 the at least one criterion relating to the first data connection. The at least one criterion relating to the first data connection may comprise, for example, a received signal strength threshold value for the first connection corresponding to a signal strength that is the lowest acceptable signal strength for maintaining the first data connection.

The method continues with determining 625 whether the at least one criterion is fulfilled. For example, the at least one criterion may be fulfilled if the received signal strength is below the received signal strength threshold value.

The method continues with sending 630 a request to an access node to activate at least one sidelink device and sending 635 an instruction to the access node to deactivate a previous sidelink device.

Without limiting the scope of the claims, an advantage of predicting a second data connection and activating a sidelink device may be that a temporary loss of connection may be avoided in an environment where a moveable device might not be in a line of sight of an access node. Another advantage may be that handover for a moveable device from a first data connection to a second data connection may be initiated before the current communication link is lost. A further advantage may be that sidelink devices may be selectively optimized. An advantage of a learning algorithm may be that dynamic changes in, for example, a production environment may be handled efficiently.

Without in any way limiting the scope, interpretation, or application of the claims appearing below, a technical effect of one or more of the example embodiments disclosed herein is that safety and/or productivity in a production environment may be improved. Another technical effect is that selectively activating sidelink devices, interfering signals in the wireless may be reduced, thereby improving signal quality.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one processor and at least one memory storing instructions that, when executed by the at least one processor, cause the apparatus at least to:
   receive information relating to available connections in a wireless network, the wireless network comprising at least one access node and at least one sidelink device;
   collect information relating to a mobility pattern of at least one moveable device within a predetermined area covered by the wireless network;
   establish a first data connection to the wireless network for the moveable device;
   determine that a signal strength related to the first data connection satisfies a signal strength threshold value;
   activate, responsive to the signal strength satisfying the signal strength threshold value, a learning algorithm;
   predict, using the learning algorithm, based on the mobility pattern of the moveable device and the information relating to the available connections in the wireless network, a second data connection to be established to the wireless network for the moveable device; and
   send, in response to determining that at least one criterion related to the first data connection is fulfilled, a request to the at least one access node to activate the at least one sidelink device for providing the second data connection.

2. The apparatus according to claim 1, wherein the information relating to the available connections in the wireless network comprises information on a plurality of previously established data connections between the moveable device and the wireless network.

3. The apparatus according to claim 1, wherein the first data connection comprises a data connection between the access node and the moveable device.

4. The apparatus according to claim 1, wherein the second data connection comprises a device-to-device connection between the moveable device and the at least one sidelink device.

5. The apparatus according to claim 1, wherein the at least one memory also stores instructions that, when executed by the at least one processor, cause the apparatus to update the information relating to the available connections in the wireless network.

6. The apparatus according to claim 1, wherein the at least one memory also stores instructions that, when executed by the at least one processor, cause the apparatus to activate the learning algorithm in response to a loss of connection to the wireless network.

7. The apparatus according to claim 6, wherein the at least one memory also stores instructions that, when executed by the at least one processor, cause the apparatus to trigger a network scan for discovering sidelink devices.

8. The apparatus according to claim 1, wherein the predetermined area comprises a production environment.

9. The apparatus according to claim 1, wherein the at least one sidelink device is connected to the at least one access node.

10. The apparatus according to claim 1, wherein the at least one memory also stores instructions that, when executed by the at least one processor, cause the apparatus to send an instruction to the at least one access node to deactivate a previous connection to a sidelink device.

11. A method comprising:
    receiving information relating to available connections in a wireless network, the wireless network comprising at least one access node and at least one sidelink device;
    collecting information relating to a mobility pattern of at least one moveable device within a predetermined area covered by the wireless network;
    establishing a first data connection to the wireless network for the moveable device;
    determining that a signal strength related to the first data connection satisfies a signal strength threshold value;
    activating, responsive to the signal strength satisfying the signal strength threshold value, a learning algorithm;
    predicting, using the learning algorithm, based on the mobility pattern of the moveable device and the information relating to the wireless network, a second data connection to be established to the wireless network for the moveable device; and
    sending, in response to determining that at least one criterion related to the first data connection is fulfilled, a request to the at least one access node to activate the at least one sidelink device for providing the second data connection.

12. A system configured to:
    receive information relating to available connections in a wireless network, the wireless network comprising at least one access node and at least one sidelink device;

collect information relating to a mobility pattern of at least one moveable device within a predetermined area covered by the wireless network;

establish a first data connection to the wireless network for the moveable device;

determine that a signal strength related to the first data connection satisfies a signal strength threshold value;

activate, responsive to the signal strength satisfying the signal strength threshold value, a learning algorithm;

predict, using the learning algorithm, based on the mobility pattern of the moveable device and the information relating to the wireless network, a second data connection to be established to the wireless network for the moveable device; and send, in response to determining that at least one criterion related to the first data connection is fulfilled, a request to the at least one access node to activate the at least one sidelink device for providing the second data connection.

13. A non-transitory computer readable medium comprising program instructions that, when executed by an apparatus, cause the apparatus to perform at least the following:

receiving information relating to available connections in a wireless network, the wireless network comprising at least one access node and at least one sidelink device;

collecting information relating to a mobility pattern of at least one moveable device within a predetermined area covered by the wireless network;

establishing a first data connection to the wireless network for the moveable device;

determining that a signal strength related to the first data connection satisfies a signal strength threshold value;

activating, responsive to the signal strength satisfying the signal strength threshold value, a learning algorithm;

predicting, using the learning algorithm, based on the mobility pattern of the moveable device and the information relating to the wireless network, a second data connection to be established to the wireless network for the moveable device; and sending, in response to determining that at least one criterion related to the first data connection is fulfilled, a request to the at least one access node to activate the at least one sidelink device for providing the second data connection.

14. The method according to claim 11, wherein the information relating to the available connections in the wireless network comprises information on a plurality of previously established data connections between the moveable device and the wireless network.

15. The method according to claim 11, wherein the first data connection comprises a data connection between the access node and the moveable device.

16. The method according to claim 11, wherein the second data connection comprises a device-to-device connection between the moveable device and the at least one sidelink device.

17. The method according to claim 11, further comprising updating the information relating to the available connections in the wireless network.

18. The method according to claim 11, further comprising activating the learning algorithm in response to a loss of connection to the wireless network.

19. The apparatus according to claim 1, wherein the mobility pattern comprises a track and a direction of movement of the moveable device.

20. The method according to claim 11, wherein the mobility pattern comprises a track and a direction of movement of the moveable device.

* * * * *